UNITED STATES PATENT OFFICE.

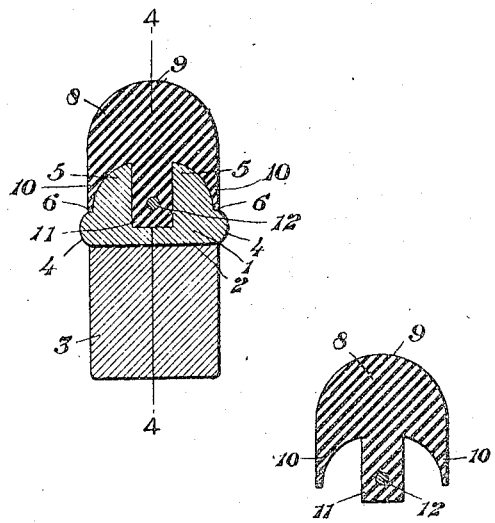
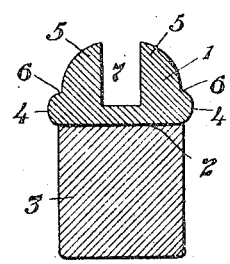
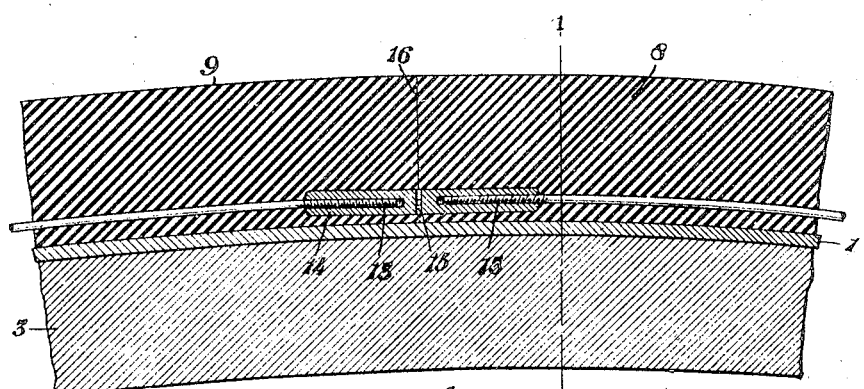

GROVER C. ALLISON, OF LOUISVILLE, OHIO.

VEHICLE-TIRE.

1,057,398.  Specification of Letters Patent.  Patented Apr. 1, 1913.

Application filed January 22, 1912. Serial No. 672,753.

*To all whom it may concern:*

Be it known that I, GROVER C. ALLISON, a citizen of the United States, residing at Louisville, in the county of Stark and State of Ohio, have invented a new and useful Vehicle-Tire, of which the following is a specification.

My invention relates to improvements in vehicle tires comprising two members, one a non-resilient, permanent member and the second a resilient, removable member.

The objects of my invention are to generally improve devices of the character mentioned and to provide a simple and efficient vehicle tire adapted for practical use under varying road conditions. These objects, together with other objects apparent to those skilled in the art may be attained by the construction illustrated in the accompanying drawing, although the invention may be embodied in other forms, the construction illustrated being chosen by way of example.

In the drawing Figure 1 is a transverse sectional view through a vehicle tire embodying my invention arranged upon a felly, said view being taken on the line 1—1 of Fig. 4. Fig. 2 is a similar view of the non-resilient member and felly. Fig. 3 is a similar view of the resilient member only. Fig. 4 is a sectional view on the line 4—4 of Fig. 1.

Throughout the several views similar reference numerals indicate similar parts.

The non-resilient member 1 is preferably formed of metal and consists of a hoop adapted to be applied to the periphery of the felly of a wheel somewhat after the manner of the well-known steel tires commonly in use. The construction of the non-resilient member is well illustrated in Fig. 2 where it will be noted that the flat or base side 2 of the felly attaching portion of the member is adapted to be applied to the periphery of the felly 3.

The member 1 is provided with the rounding, lateral projection 4 extending beyond the planes of the sides of the felly 3. Formed integrally with the felly attaching portion the substantially semi-circular, radially projecting resilient-member-supporting portion 5 is provided, the curved outer face of which at each side joins the felly-attaching portion substantially in the plane of the side of the felly 3, thus producing an off-set with the projection 4 at 6 on each side. Extending into the body of the member 1 and preferably to a point more nearly adjacent the felly 3 than the offsets at 6 is the outwardly open, annular slot 7, preferably with substantially parallel side walls, arranged at substantially right angles to the bottom of said slot.

The resilient member illustrated in cross section in Fig. 3 is preferably composed of rubber and formed with a body portion 8, the periphery of which constitutes the tread surface 9. Formed integrally with the portion 8 are the inwardly extended side flanges 10 adapted to overlie the portions 5 of the non-resilient member, the extreme inner edges of said flanges fitting against the offsets at 6. Also formed integrally with the portion 8 is the inwardly extended attaching portion 11 constituting an inwardly disposed annular member adapted to fit into the slot 7 of the non-resilient member. In the body of the portion 11 an annular retaining wire 12 is provided having the oppositely threaded ends 13 adapted to be connected by a single turnbuckle 14. Said turnbuckle is provided intermediate its ends with transverse apertures 15, said apertures being adapted to receive the point of an instrument or tool for turning the turnbuckle as will be well understood by those skilled in the art. The resilient member is not continuous, but is provided with two ends shown abutting at 16 in Fig. 4. At each end the wire receiving aperture in the portion 11 is enlarged to receive the turnbuckle, and in applying the resilient member to the non-resilient member, the ends of the resilient member may be forced apart from each other in an annular direction a sufficient distance to permit the turnbuckle 14 to be applied to the ends of the wire 12. After the wire has been drawn up taut by the turnbuckle the ends of the resilient member may be crowded annularly along the non-resilient member until said ends abut as shown in Fig. 4 in accordance with the method commonly employed in the application of analogous vehicle tires.

One of the principal objects of the present invention is to provide for the ready removal of the resilient member, leaving a non-resilient member capable of practical use by itself as a tire. As is well understood in the winter and spring when rural roads are in rough condition it is not only unnecessary to employ a resilient tire but it is also very injurious to said tire if it is used. With the present invention the resilient member may be readily removed with the aid of few and simple tools whereupon the vehicle may run upon the non-resilient member. When it is again desired to apply the resilient member it is only necessary to remove the dirt or mud from the slot 10 and to clean the peripheral surfaces of the portions 5 whereupon the resilient member may be applied with the same few and simple tools mentioned, and the vehicle will be in condition for use as a resilient-tired vehicle.

With vehicle tires heretofore commonly in use it has usually been necessary to secure the services of a skilled workman having special tools and devices to accomplish the application of the resilient tire to the rim of the wheel, the wires of such tires in many cases being held by special clamping and tightening devices until brazed together. This necessitates annoyance and expense which the present invention will avoid. Attention should also be called to the fact that with tires heretofore commonly in use, when the resilient member is removed, either intentionally or by accident, the rim, usually of channel shape, is injured by contact with stone and the like, whereas in the present invention the non-resilient member is so constructed as to be admirably adapted for use when the resilient member has been removed.

It should be noted that the depth of the slot 7 is such as to prevent the accidental displacement of the resilient member which so commonly causes trouble and inconvenience with vehicle tires heretofore in use, while said slot being narrow as compared with the total width of the non-resilient member, a substantial surface of said non-resilient member will be presented as a tread surface when the resilient member has been removed.

I claim:—

For a vehicle wheel provided with a felly, a tire, comprising a non-resilient member and a resilient member; said non-resilient member comprising a felly attaching portion adapted to be applied to the periphery of the felly, integral, lateral, rounding projections extending beyond the planes of the sides of said felly, and an integral resilient-member-supporting portion, substantially semi-circular in cross-section and having its curved outer face at each side joined to said felly attaching portion substantially in the planes of the sides of said felly, producing off-sets with said lateral projections, said resilient-member-supporting portion provided with a parallel walled slot extending into the body of the non-resilient member to a point more nearly adjacent said felly than the said off-sets; and a resilient member comprising a body portion having an outer curved tread surface, integral, inwardly extended side flanges having their inner sides adapted to fit the curved outer face of said projecting resilient-member-supporting portion, the extreme edges of said flanges adapted to fit against said off-sets, and an integral, inwardly extended attaching portion adapted to fit into the said slot of the non-resilient member and a retaining wire arranged in said attaching portion for retaining said attaching portion within said slot.

In testimony that I claim the above, I have hereunto subscribed my name in the presence of two witnesses.

GROVER C. ALLISON.

Witnesses:
HENRY P. ALLISON,
DALLAS ALLISON.